(No Model.)

H. W. TILTON.
CAR COUPLING.

No. 314,275. Patented Mar. 24, 1885.

WITNESSES.
Haldwin Bates
Wm S Rogers

INVENTOR.
Hubbard W Tilton
By his attorney
W P Preble Jr

UNITED STATES PATENT OFFICE.

HUBBARD W. TILTON, OF BOSTON, MASSACHUSETTS.

CAR-COUPLING.

SPECIFICATION forming part of Letters Patent No. 314,275, dated March 24, 1885.

Application filed January 12, 1885. (No model.)

*To all whom it may concern:*

Be it known that I, HUBBARD W. TILTON, a citizen of the United States, and a resident of Boston, in the county of Suffolk and State of Massachusetts, have invented a new and useful Improvement in Car-Couplings, of which the following is a specification.

The object of my invention is to provide an automatic car-coupling which consists of a weighted hook suitably mounted in the draw-head, in combination with a slotted link arranged in connection with said hook and hung independently thereof in such manner that it can be readily driven out of place when it is desired that said hook should couple with another link, but is at all times ready to couple with another hook if presented to it, thus enabling my improved car-coupling to be used with all kinds and classes of couplings which employ a link or hook or link and pin. The means by which I accomplish this result is shown in the accompanying drawings, in which—

Figure 1:
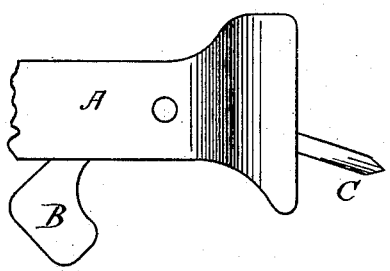
Figure 2:
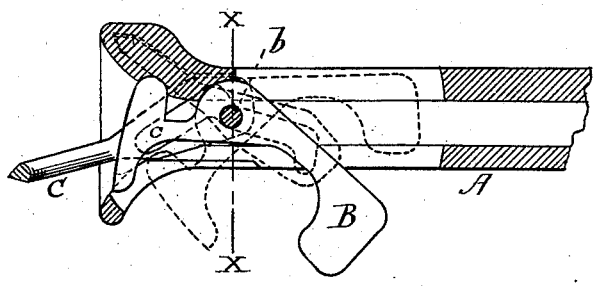
Figure 3:
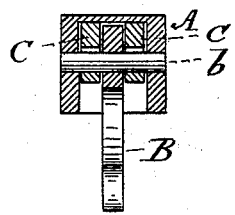
Figure 4:
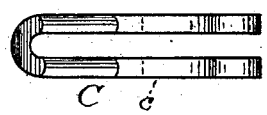

Figure 1 is a side elevation of the draw-head ready for coupling. Fig. 2 is a side view showing the different positions assumed by the link and hook, the draw-head being in section. Fig. 3 is a vertical section on line $x$ $x$ of Fig. 1. Fig. 4 is a detail of the slotted link.

The same letters indicate similar parts in the various figures.

A is the draw-head.

B is a weighted hook hung in the draw-head on pin $b$. The normal position of this hook is that shown in Fig. 1, and by full lines in Fig. 2. From this position it is temporarily displaced by a link entering the draw-head for coupling or by suitable releasing devices for uncoupling, and driven more or less nearly into the position shown in dotted lines in Fig. 2, but resumes its normal position as soon as the link has entered or the uncoupling accomplished.

C is a coupling-link of somewhat peculiar construction. The forward part is rounded, and has a beveled tip. The rear part is broadened out, and is provided with a slot, $c$. This link is loosely hung on the pivot $b$, which normally rests in a depression at the rear of slot $c$, and before coupling is in the position shown in Fig. 1.

The automatic operation of my improved coupling is as follows: If the link of the car to be coupled therewith strikes the link C on the under side, it throws it up into the position shown in dotted lines in Fig. 2, and itself advances to clutch the hook B and the coupling is complete, the link C having been driven back completely into the draw-head, and the pin $b$ being now at the extreme front of slot $c$. When the cars are uncoupled, the weight of the forward part of link C causes it to fall back into its normal position, as shown in Fig. 1. If the link of the car to be coupled therewith strikes the link C on the upper side, it simply slides along, depressing the hook in the usual way until it reaches its proper position, when the weight of the hook restores its equilibrium, and the entering link is clutched and held and the coupling is complete.

I claim—

1. An automatic car-coupling which consists of a weighted hook suitably mounted in the draw-head, in combination with a slotted link arranged in connection with said hock and hung independently thereof in such manner that it can be readily driven out of place when it is desired that said hook should couple with another link, but is at all times ready to couple with another hook if presented to it, as herein described, and for the purposes specified.

2. The above-described slotted link C, mounted in the draw-head, and arranged substantially as herein described and shown.

HUBBARD W. TILTON.

Witnesses:
 WALDRON BATES,
 W. P. PREBLE, Jr.